United States Patent
Wu et al.

(10) Patent No.: US 7,633,593 B2
(45) Date of Patent: Dec. 15, 2009

(54) LIQUID CRYSTAL PANEL AND FABRICATION METHOD THEREOF

(75) Inventors: Pin-Chun Wu, Gueishan Township, Taoyuan County (TW); Zsan-Zsan Cheng, Gueishan Township, Taoyuan County (TW); Chih-Chieh Chang, Gueishan Township, Taoyuan County (TW); Lin-Huei Wang, Gueishan Township, Taoyuan County (TW)

(73) Assignee: AU Optronics Corp., Hsinchu (TW)

( * ) Notice: Subject to any disclaimer, the term of this patent is extended or adjusted under 35 U.S.C. 154(b) by 425 days.

(21) Appl. No.: 11/392,975

(22) Filed: Mar. 28, 2006

(65) Prior Publication Data

US 2006/0279688 A1    Dec. 14, 2006

(30) Foreign Application Priority Data

Jun. 10, 2005    (TW) ............................... 94119251 A

(51) Int. Cl.
G02F 1/1339    (2006.01)
G02F 1/1333    (2006.01)

(52) U.S. Cl. ...................................... 349/155; 349/110
(58) Field of Classification Search ........................ None
See application file for complete search history.

(56) References Cited

U.S. PATENT DOCUMENTS 6,535,264 B1    3/2003    Imabayashi
6,707,525 B2    3/2004    Miyazaki
7,492,435 B2 *    2/2009    Jeon ............................ 349/155
2005/0190336 A1 *    9/2005    Chen ........................... 349/155
2005/0275788 A1 *    12/2005    Tsai ............................ 349/187
2006/0103803 A1 *    5/2006    Jeon et al. ..................... 349/155

FOREIGN PATENT DOCUMENTS

JP    2001142074    5/2001
JP    2003066464    3/2003
JP    2005017856    1/2005

OTHER PUBLICATIONS

CN Office Action mailed Aug. 3, 2007.
English Translation of Japanese Application Publication No. 2001-142074 Abstract. (Published May 25, 2004).
English Translation of Japanese Application Publication No. 2003-066464 Abstract. (Published Mar. 5, 2003).

* cited by examiner

*Primary Examiner*—Tina M Wong
(74) *Attorney, Agent, or Firm*—Thomas, Kayden, Horstemeyer & Risley

(57) ABSTRACT

A liquid crystal panel and method for fabricating the same are provided. A plurality of photo spacers and ball spacers are disposed between a color filter substrate and an array substrate. The device for simultaneously applying photo spacers and ball spacers exhibits the ability to eliminate force impact and overcome problems such as touch mura and sound mura.

12 Claims, 6 Drawing Sheets

LIQUID CRYSTAL PANEL AND FABRICATION METHOD THEREOF

BACKGROUND OF THE INVENTION

1. Field of the invention

The invention relates to a liquid crystal panel and fabrication method thereof, and more particularly, to a liquid crystal panel having improved optical properties.

2. Background

In the current display technology, liquid crystal panel having the advantages of small size, low weight, low electricity consumption, full-color display, and potentially taking the place of conventional cathode ray tube (CRT).

Generally speaking, liquid crystal panel fabrication utilizes ball spacers or photo spacers.

FIG. 1 shows a conventional liquid crystal panel using ball spacers. The panel comprises color filter substrate 101 and array substrate 102, with ball spacers 170 disposed therebetween, and liquid crystal material 180 filled therebetween to adjust the amount of light by rotation of liquid crystal when applying an electric field.

FIG. 2 shows another conventional liquid crystal panel using photo spacers. The panel comprises color filter substrate 201 and array substrate 202, with photo spacers 260 disposed therebetween, and liquid crystal material 180 filled therebetween.

FIG. 3 is a flowchart of a conventional vacuum injection process injecting liquid crystal material into a panel through an opening in a seal pattern, applying a pressure difference between the interior and exterior of the panel and capillarity.

As shown in FIG. 3, the fabrication process comprises forming a color filter substrate and an array substrate in step 30a and 30b respectively, forming an alignment layer on the two substrates respectively in step 31, rubbing the alignment layer to freely align subsequently-formed liquid crystal molecules of a liquid crystal material in step 32, forming a seal pattern with an opening in step 33, scattering ball spacers on the array substrate to maintain a uniform cell gap between the two substrates in step 34, bonding the two substrates in step 35, cutting the bonded large substrates into a plurality of small panels in step 36, injecting a liquid crystal material into each panel by vacuum injection method in step 37, sealing the opening of the panels in step 38, and cleaning the panels in step 39.

U.S. Pat. No. 20040125319 A1 discloses a liquid crystal device fabricated by conventional vacuum injection, which eliminates gravity mura.

Only a single type of spacers is normally used to maintain uniform cell gap. However, with increased panel size, possible touch mura or sound mura results if only one type of spacers is used.

Moreover, it is difficult to use vacuum injection in panel fabrications, especially in larger panel fabrications. It can take up to 5 days to inject a liquid crystal material into the cell gap of a 30-inch panel by vacuum injection, and utility rate (60% or less) of liquid crystal material is also low. There is therefore a need in panel fabrication to address the short injection time requirement and overcome problems such as touch mura and sound mura.

SUMMARY

In an embodiment, a liquid crystal panel is provided, comprising a first substrate and a second substrate opposite to the first substrate. A gate line and data line are formed on the first substrate, a switch is formed at an intersection of the gate line and the data line, a color filter is formed on the second substrate, a plurality of ball spacers and photo spacers are disposed between the first substrate and the second substrate, and a liquid crystal material is interposed between the first substrate and the second substrate.

A method for fabricating a liquid crystal panel is also provided. A first substrate is provided. A second substrate is provided. A plurality of photo spacers is formed on the first substrate. A plurality of ball spacers is formed on the second substrate. A liquid crystal material is dropped on the first substrate or the second substrate, and the two substrates are then combined.

In another method for fabricating a liquid crystal panel, a first substrate is provided. A second substrate is provided. A plurality of photo spacers and ball spacers is formed on the first substrate. A liquid crystal material is dropped on the first substrate or the second substrate, and the two substrates are then combined.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
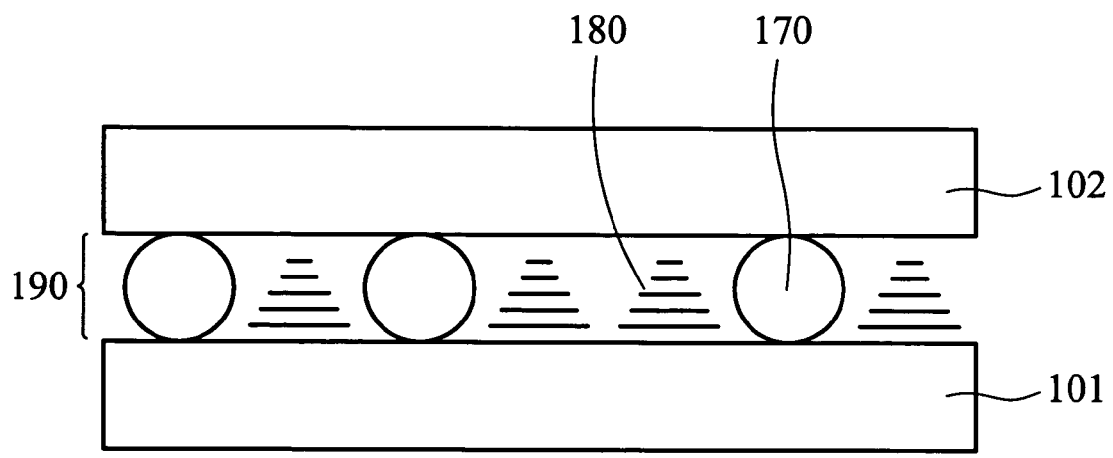
FIG. 1 shows a conventional liquid crystal panel using only ball spacers.
Figure 2:
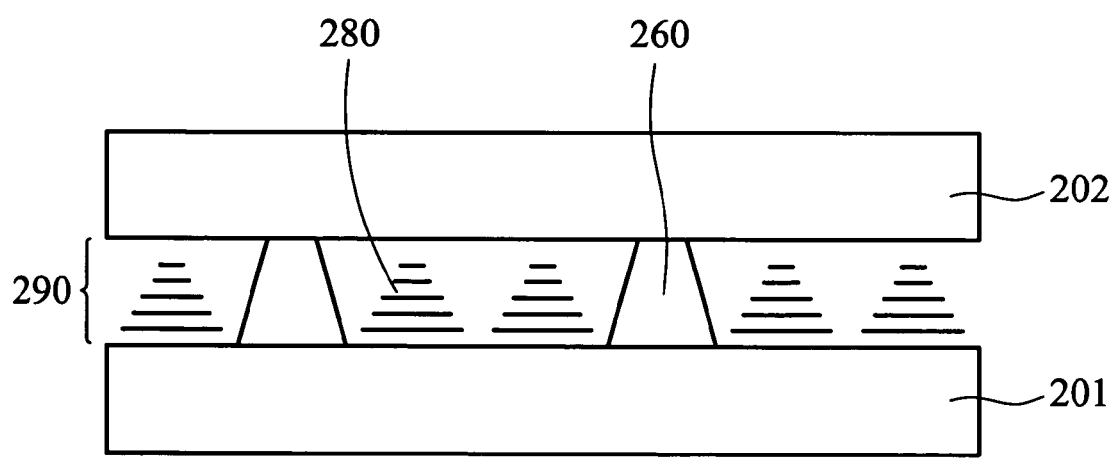
FIG. 2 shows a conventional liquid crystal panel using only photo spacers.
Figure 3:
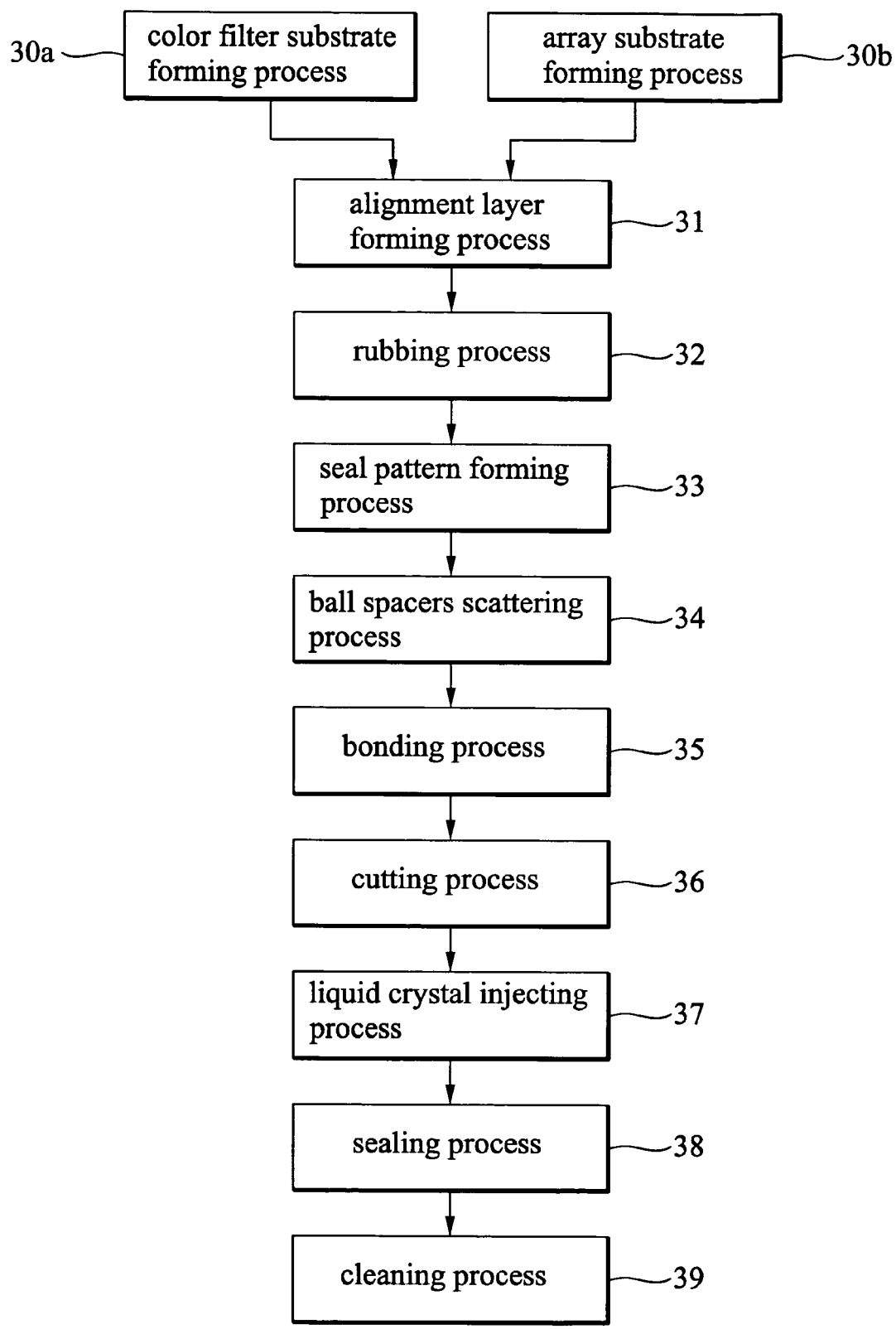
FIG. 3 is a flowchart of a conventional process using vacuum injection.
Figure 4A:
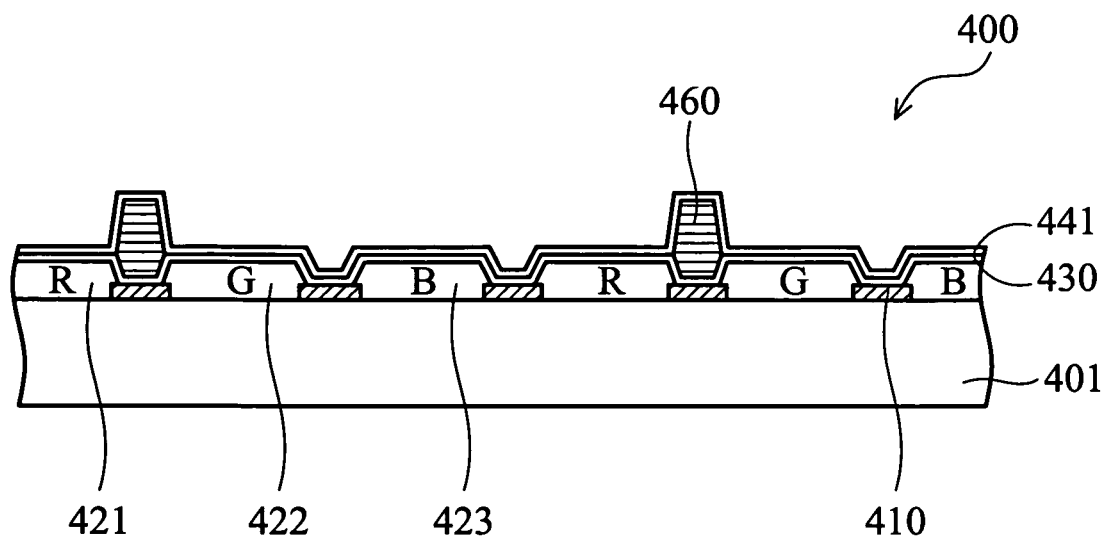
FIGS. 4a, 4b, and 4e illustrate a portion of the liquid crystal panel according to an embodiment of the invention.
Figure 4B:
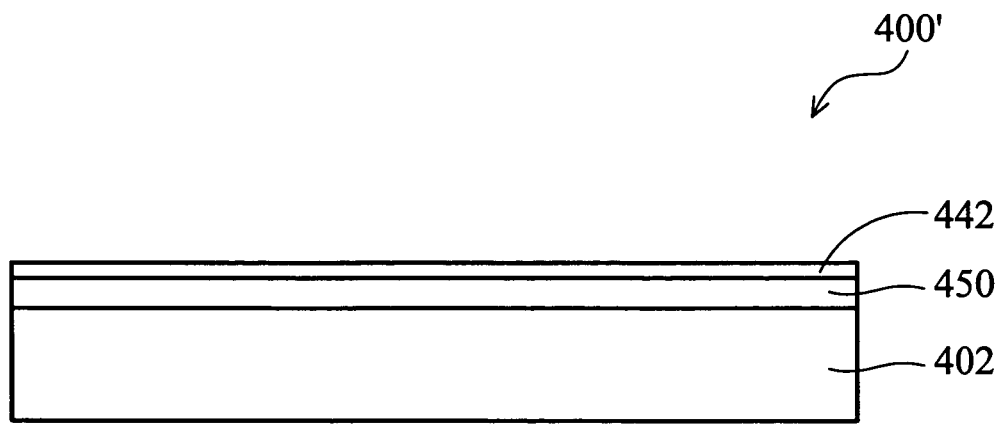

FIG. 4a is a color filter substrate 400 having a first substrate 401, which is substantially transparent, preferably of glass, quartz or plastic. The first substrate 401 comprises black matrices 410, color filters 421 (R for red), 422 (G for green), 423 (B for blue), a transparent conductive layer 430, and a first alignment layer 441. The black matrices 410 can be of chromium (Cr), resin or other opaque material. The three colors of R, G, B can be formed on the first substrate 401 to form the color filters 421, 422, and 423 by well-known methods such as dyeing, pigment dispersion, printing, or electrodeposition. The transparent conductive layer 430 can be of one or more metal oxide layers, such as indium tin oxide (ITO) layer. The first alignment layer 441 can be of polymer, such as polyimide (PI) to form a thin layer at a thickness between about 500 to 1000 Å by well-known methods such as gravure. Uniform photo spacers 460 are formed on black matrices 410 at a predetermined distance to support the first substrate 401 and the second substrate 402 to maintain a uniform cell gap 490 (as shown in FIG. 4e). In an embodiment, the photo spacers 460 are disposed apart from each other by one pixel intervals in data line and gate line directions. The photo spacers 460 can be formed by photolithography or etching. The photo spacers 460 exhibit the ability to eliminate force impact by absorbing force from pressure or vibration. Photo spacers 460 can be, but are not limited to, disposed on the color filter substrate 400, while photo spacers 460 can also be disposed on the array substrate 400' (as shown in FIG. 4b). The cross-section of photo spacers 460 can be any shape, such as a quadrilateral, hexagon, octagon, polygon, circle, or any other shape. The photo spacer 460 can be a cube, cylinder, sphere, quadrilateral column, hexagonal column, octagonal column, or any other polygonal column.

FIG. 4b shows an array substrate 400' having a transparent second substrate 402, preferably of glass, quartz or plastic, with a circuit layer 450 and a second alignment layer 442 formed thereon. Although it is not shown in FIG. 4b, the circuit layer 450 comprises gate lines, date lines, switches, a passivation layer and a transparent conductive layer. The second alignment layer 442 can be of the same material as the first alignment layer 441.

Figure 4C:
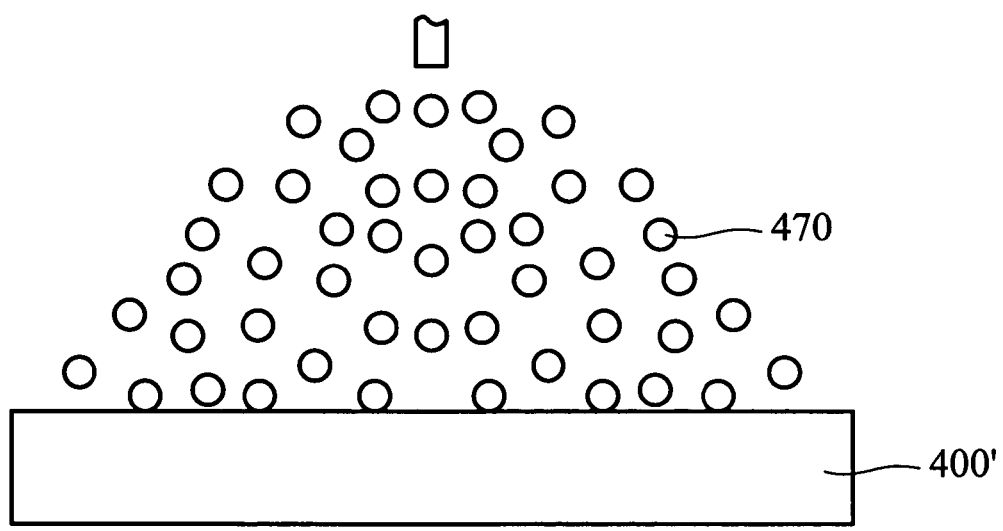
FIG. 4c illustrates a process for scattering ball spacers.
Figure 4D:
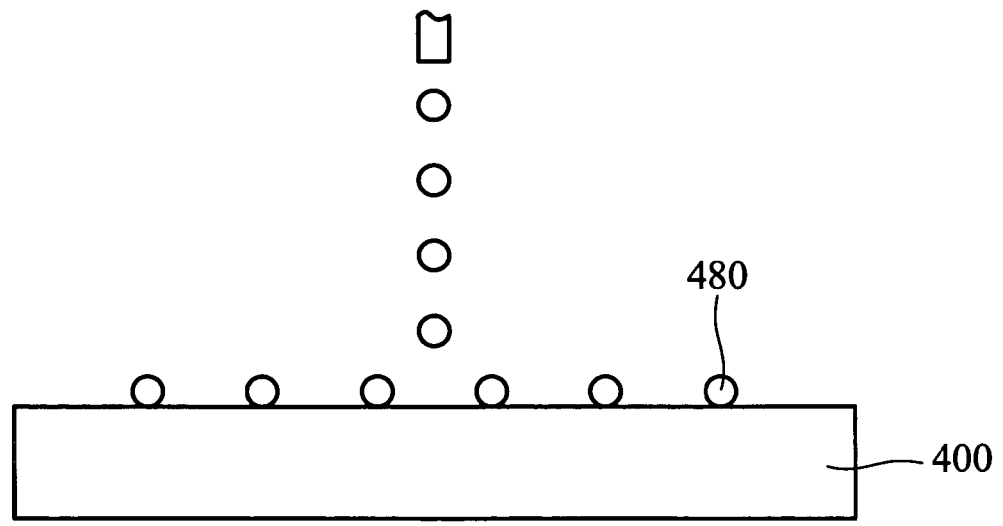
FIG. 4d illustrates One Drop Fill (ODF) process.
Figure 4E:
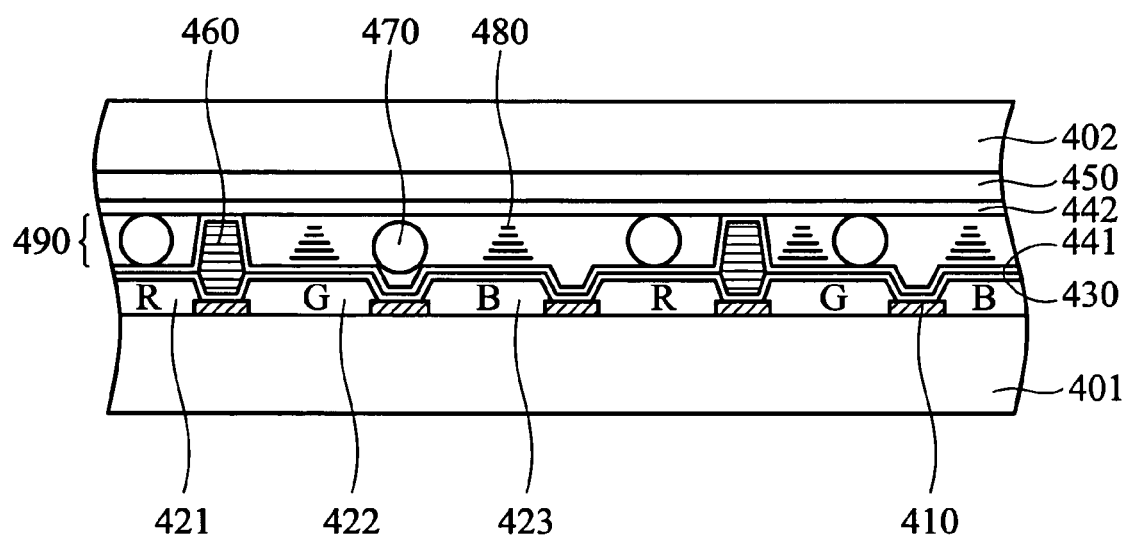

FIG. 4c shows a scattering of uniform ball spacers 470 on array substrate 400' to support the first substrate 401 and the second substrate 402 to maintain a uniform cell gap 490 (as shown in FIG. 4e) by well-known methods such as dry spray or wet spray. The distribution density of ball spacers 470 is at least 160 per cm$^2$, preferably 160 to 300/cm$^2$ or 160 to 250/cm$^2$, more preferably 160 to 200/cm$^2$. Ball spacers 470 can be, but are not limited to, disposed on the array substrate 400', while ball spacers 470 can also be disposed on the color filter substrate 400. The cross-section of ball spacers 470 can be any shape, such as a quadrilateral, hexagon, octagon, polygon, circle, or any other shape. The ball spacer 470 can be a cube, cylinder, sphere, quadrilateral column, hexagonal column, octagonal column, or any other polygonal column. The ball spacers 470 can be resin, silica, glass fiber, or photosensitive materials. Ball spacers 470 eliminate force impact by absorbing force from pressure or vibration. For example, the pressures can be 2 kgf of pressure by hand-touch or by a roller for testing a panel, and the vibrations can be produced by high-frequency vibration comprising sound vibration from an amplifier near a panel.

FIG. 4d shows a One Drop Fill (ODF) process, comprising dropping a liquid crystal material 480 on the color filter substrate 400, and then combining with array substrate 400' by sealant material pre-coated on the color filter substrate 400 or the array substrate 400' to form a panel. After the combination, liquid crystal material 480 is filled in the space between the two substrates, as shown in FIG. 4e. Liquid crystal material 480 can be, but is not limited to, dropped on the color filter substrate 400, while liquid crystal material 480 can also be dropped on the array substrate 400'.

FIG. 4e shows a liquid crystal panel according to an embodiment of the present invention. The panel comprises a transparent-first substrate 401 and a second substrate 402 opposite the substrate 401. A circuit layer 450, comprising gate lines, date lines, switches, a passivation layer and a transparent conductive layer, is formed on the second substrate 402. Color filters 421, 422, and 423 are formed on the first substrate 401. Ball spacers 470 are formed between the first substrate 401 and the second substrate 402. The cross-section of ball spacers 470 can be any shape, such as a quadrilateral, hexagon, octagon, polygon, circle, or any other shape. The ball spacer 470 can be a cube, cylinder, sphere, quadrilateral column, hexagonal column, octagonal column, or any other polygonal column. The distribution density of ball spacers 470 is at least 160 per cm$^2$, preferably 160 to 300/cm$^2$ or 160 to 250/cm$^2$, more preferably 160 to 200/cm$^2$. Ball spacers 470 eliminate force impact by absorbing force from pressure or vibration. For example, the pressures can be 2 kgf of pressure by hand-touch or by a roller for testing a panel, and the vibrations can be produced by high-frequency vibration comprising sound vibration from an amplifier near a panel. The cross-section of photo spacers 460 can be any shape, such as a quadrilateral, hexagon, octagon, polygon, circle, or any other shape. The photo spacer 460 can be a cube, cylinder, sphere, quadrilateral column, hexagonal column, octagonal column, or any other polygonal column. Photo spacers 460 can also eliminate force impact as described. Liquid crystal material 480 is filled between the two substrates.

Figure 5:
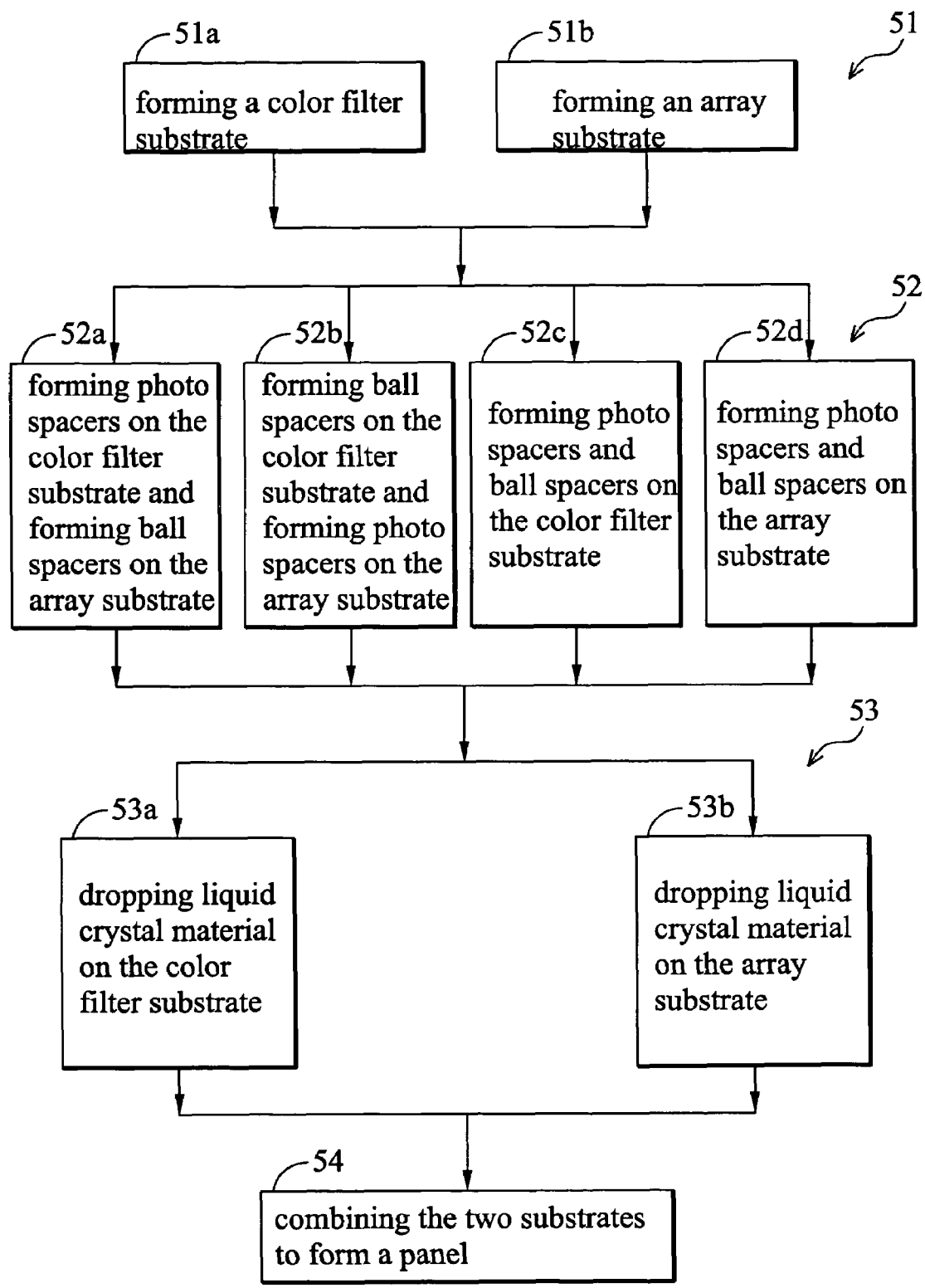
FIG. 5 is a flowchart of fabrication of the liquid crystal panel according the invention.

FIG. 5 is a flowchart of fabrication of a liquid crystal panel according to the invention. In FIG. 5, the fabrication method comprises forming the two substrates in step 51, forming the two spacers in step 52, forming liquid crystal material in step 53, and combining the two substrates in step 54. The fabrication method comprises forming a color filter substrate in step 51a and forming an array substrate in step 51b respectively, then forming photo spacers on the color filter substrate and forming ball spacers on the array substrate in step 52a, forming ball spacers on the color filter substrate and forming photo spacers on the array substrate in step 52b, forming photo spacers and ball spacers on the color filter substrate in step 52c, or forming photo spacers and ball spacers on the array substrate in step 52d, and dropping liquid crystal material on the color filter substrate in step 53a or dropping liquid crystal material on the array substrate in step 53b, and combining the two substrates to form a panel in step 54.

The device for simultaneously applying photo spacers and ball spacers exhibits the ability to eliminate force impact and overcome problems such as touch mura and sound mura. The term "touch mura" means a non-uniform display problem caused by direct touch such as hand-touch; the term "sound mura" means a non-uniform display problem caused by high-frequency vibration such as sound vibration from amplifier near a panel.

Sound mura appears in conventional panels using only photo spacers or ball spacers, upon on application of sound vibrations to the panel. However, when rolling the inventive panel 3 times at 2 kgf of pressure from panel left to right, no touch mura is observed. When further vibrating the panel at high-frequency such as 80, 160, and 320 MHz, no sound mura is observed. The cell gap of the inventive panel is about 4.5 um, photo spacers are about 18 um*18 um*4.7 um, distribution of photo spacers is 1 spacer/pixel, diameter of ball spacers is about 4.6 to 4.8 um, and ball spacers is about 160 to 200/cm$^2$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A method for fabricating a liquid crystal panel comprising:
   providing a first substrate;
   providing a second substrate;
   forming a plurality of photo spacers to overlap a plurality of black matrices of the first substrate;
   forming a plurality of ball spacers on the second substrate;
   dropping a liquid crystal material on the first substrate or the second substrate; and
   combining the first substrate with the second substrate.

2. The method of claim 1, wherein the ball spacers are distributed at least 160 per cm$^2$.

3. The method of claim 1, wherein the ball spacers are distributed about 160 to 300 per cm$^2$.

4. The method of claim 1, wherein the ball spacers and the photo spacers absorb force resulting from pressure or vibration.

5. The method of claim 4, wherein the pressure comprises a direct hand-touch.

6. The method of claim 4, wherein the vibration comprises a high-frequency sound vibration resulting near the liquid crystal panel.

7. A method for fabricating a liquid crystal panel comprising:

providing a first substrate;

providing a second substrate;

forming a plurality of photo spacers and ball spacers on the first substrate, wherein the plurality of photo spacers are formed to overlap a plurality of black matrices;

dropping a liquid crystal material on the first substrate or the second substrate, and combining the first substrate with the second substrate.

8. The method of claim 7, wherein the ball spacers are distributed at least 160 per $cm^2$.

9. The method of claim 7, wherein the ball spacers are distributed about 160 to 300 per $cm^2$.

10. The method of claim 7, wherein the ball spacers and the photo spacers absorb force resulting from pressure or vibration.

11. The method of claim 10, wherein the pressure comprises a direct hand-touch.

12. The method of claim 10, wherein the vibration comprises a high-frequency sound vibration resulting near the liquid crystal panel.

* * * * *